Figures 1, 2:
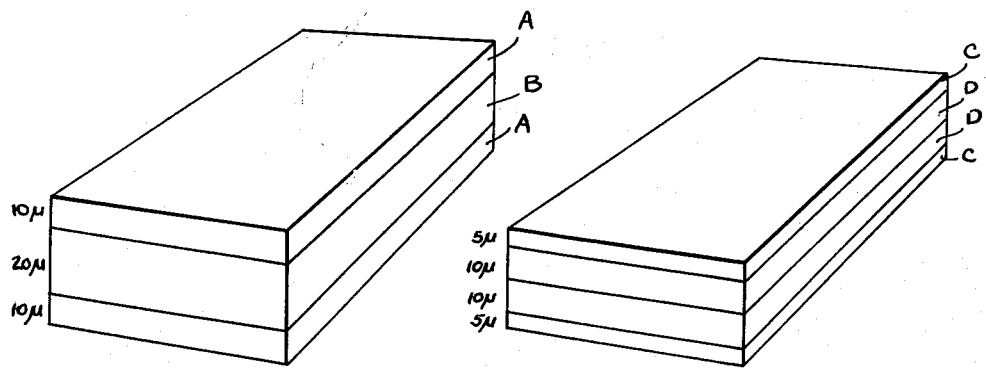

Feb. 16, 1965     T. PLOETZ     3,170,013
METHOD OF PRODUCING LAMINATED PLASTIC FOILS AND FILMS
Filed Dec. 20, 1960

INVENTOR.
THEODOR PLOETZ
BY
Erich M. H. Radde
AGENT

3,170,013
METHOD OF PRODUCING LAMINATED PLASTIC FOILS AND FILMS
Theodor Ploetz, Am Adels 19, Hoesel,
Kreis Mettmann, Germany
Filed Dec. 20, 1960, Ser. No. 77,248
6 Claims. (Cl. 264—255)

The present invention relates to plastic sheet material, and more particularly to laminated plastic foils or films, and to a method of producing the same.

Plastic foils, films, and the like sheet material are being used on a large scale as wrapping and packing materials. They have replaced paper and coated paper in many applications because of their superior effect as diffusion barriers and of other valuable properties. Although the cost of the plastic material on a weight basis is substantially higher than that of paper products, some plastic foils are effective diffusion barriers in very thin films, and thus economically competitive.

At present, plastic films and foils are made largely, though not exclusively, of polyethylene and of polyvinylidene chloride and its copolymers. Thin films of these two materials have desirable optical and mechanical properties and can be produced inexpensively. Polyethylene films and foils are effective water vapor barriers, but they are less satisfactory in preventing loss of odorous substances from the articles wrapped in therein and in preventing the penetration by such smell from outside to said articles. Copolymers of vinylidene chloride are practically impervious to such odorous substances, but do not reach different other qualities of polyethylene films.

The advantages of polyethylene films and of polyvinylidene chloride films can be combined by superimposing separate foils or sheets of the respective materials, or by combining them in a laminated structure produced from separately prepared films. Because of the handling stresses involved in making the films and in combining the layers in the laminate, there is an inherent lower limit of thickness of the individual films and the laminated product can be produced only with a considerable thickness which in itself is undesirable in many applications and which inherently raises the cost frequently beyond a permissible level.

It is a primary object of the present invention to provide a method of producing plastic films or foils which combine chemical and physical characteristics of several types of plastics not available in any one of the constituents without being limited as to minimum thickness by mechanical properties of the constituents.

Another object of this invention is to provide a method of rapidly and inexpensively producing plastic films or foils substantially equivalent to conventional laminated foils which are gas- and water vapor-tight.

A further object of this present invention is to provide such plastic laminates combining the advantageous properties of their components and being substantially gas- and water vapor-tight.

Generally, the invention aims at improved plastic wrapping materials and at an inexpensive and simple method of producing the same.

With these and other objects in view, the invention contemplates the production of a composite film from separate dispersions of at least two synthetic thermoplastic materials in liquids in which the materials are substantially insoluble, preferably in water. According to this process an impervious support is first coated with one of the dispersions. The liquid is driven off by evaporation, for instance, by heat. Thereby, the temperature is raised sufficiently to coalesce the dispersed particles of the plastic into a coherent body which then serves as a support on which a coating of another dispersion of a thermoplastic material different from the first mentioned plastic is prepared. The liquid is driven off from the resulting second dispersion coating in the same manner as described above. Thereby, the dispersed particles of the other plastic material above coalesce and form a homogeneous layer with the first plastic, thus yielding a composite body combining the physical and chemical properties of the two thermoplastic materials. Said composite body is then lifted from the impervious support.

When the two plastics are capable of adhering to each other under the conditions of the process briefly outlined above, an integral laminated film or foil is obtained as a unitary structure. Such adhesion may be achieved by selecting the plastic materials for the composite film of the invention in such a manner that they are capable of thermally activated diffusion of one plastic material into the other material, and heating conditions are selected in such a manner that some diffusion takes place, but complete permeation of the material by the other is avoided if the separate and different diffusion characteristics of the several materials are to be combined to exclude diffusion of a substance which is capable of passing through one material, but not capable of passing the other.

The dispersion coatings on the supports are preferably produced by electrostatic precipitation. A dispersion is comminuted to form small droplets. An electrostatic field is then established between the droplets and the support causing the droplets to be deposited in a very uniform coating not readily obtainable where the dispersion is applied to a support by the force of gravity or by mechanically produced kinetic energy, as by dipping, flow-coating, spraying, or extrusion. Dispersions deposited by electrostatic precipitation form coatings with low initial liquid content, and are thus rapidly dried without blistering or other disruption of the continuity of the coating.

The method of the invention is particularly advantageous when applied to film-forming plastics capable of being produced by emulsion polymerization of their monomers in an aqueous medium. The crude polymer dispersions may be employed directly to produce coatings which are then dried to form a coherent layer in the composite or laminated product. The term "laminated" as employed in this specification will be understood to include composite structures in which at least two sheet-like materials are superimposed whether or not there is diffusion of one of the materials into the other across the interface.

The utility of foils produced by the method of the invention is not limited to the complementing diffusion characteristics of the constituent film materials. The method generally permits the production of the composite foils or films which combine useful chemical and physical properties not jointly available in a single material. The invention also is not limited to laminates having two superimposed strata of different materials. Because of the inherent ability of the method of superimposing layers too thin to be self-supporting and of combining them into a laminate which itself may be very thin, more than two layers of materials may be combined without actually mixing them so as to achieve the sum of their advantageous features not possessed by the mixture.

It is possible, for example, to enclose a sheet of material having desirable mechanical strength, but not resistant to a medium in which it could otherwise be employed between two sheets of resistant, but mechanically weak material. Other combinations will readily suggest themselves to those skilled in the art.

Relatively heavy thicknesses of a single material are preferably built up by superimposing and individually drying and coalescing several thin layers of the same material in dispersion form. This procedure has the advantage that water evaporation proceeds much more readily and without the formation of bubbles or blisters in the composite structure as this will occur when drying a single thick layer of such a plastic dispersion.

The composite foils and films of the invention are readily produced in continuous processes by coating an endless band with plastic dispersions, preferably in water. The band may be heated by conduction or by radiation, and radiation may be directed against the side of the band which is coated with a layer of dispersion, or against a bare opposite side of the band. The heated run of the band is preferably of such length that the two or more coating stations may be spacedly arranged along the length thereof and the finished composite laminated foil may be lifted from a terminal portion of the heated run whereupon the band is returned to the first coating station.

It will be understood that plasticizers, stabilizers, antioxidants, fillers, fungicides, and other addition agents may be incorporated either in the dispersed plastic phase of the dispersion from which the film-forming coatings are produced, or in the continuous liquid phase. The method of this invention permits the use of a broad range of addition agents, even of those which are not capable of being incorporated in materials which are shaped into foils or film from their melts. Even in those embodiments of the method of the invention in which the plastic has to be heated to its sintering temperature to coalesce the separate particles obtained by driving off the liquid of a dispersion, the thermal resistance required of the addition agents is less by orders of magnitude than that necessary in addition agents which are incorporated in a molten plastic from which a film is formed by casting or extrusion.

The composite films or foils of the invention may be subjected to customary after-treatments known in themselves, such as stretching and heat treatments, and equipment for performing such treatments may be built into the apparatus used for performing the method of the invention as an integral treatment between individual coatings stations, only the first deposited layer or layers of the laminated structure may be subjected to such a special treatment whereas the remaining layer or layers need not undergo such treatment. As stated above, the process according to the present invention is of special advantage for those film forming plastic materials which are obtained in the form of aqueous dispersions or which can be converted into such aqueous dispersions. The properties of the laminated structures produced therefrom depend upon the properties of the synthetic resins employed. For instance, a laminated foil, the two outer layers of which consist of the copolymerization product of vinylidene chloride and acrylic acid methyl ester while its inner layer consists of the copolymerization product of butadiene and acrylonitrile possesses an excellent imperviousness to aromatic substances, oxygen, and water vapor due to the composition of the outer layers and is very pliable and flexible due to the rubber-like intermediate layer.

The following examples serve to illustrate the present invention without, however, limiting the same thereto.

*Example 1*

The following dispersions are sprayed on a rotating endless band polished to a high luster and being composed of chromium-plated steel.

The aqueous dispersion containing about 50% of a copolymerization product of 85 parts by weight of vinylidene chloride and 15 parts by weight of acrylic acid methyl ester is applied by the first spraying head to the carrier band. At the coating place and thereafter the carrier band is kept at a temperature of about 75° C. at which the water of the dispersion evaporates and the individual particles of the copolymerization product unite to a coherent film. The amount of dispersion sprayed upon the carrier band is adjusted in relation to the speed of rotation of said carrier band so that a plastic layer of about $10\mu$ thickness is produced. The heated part of the endbelt is then followed by an unheated part in order to cool the applied layer to a solid coherent film. Thereafter, the film on the carrier belt is conducted to a second spraying station at which an aqueous dispersion containing about 50% of polyisobutylene is applied thereto by spraying. The following part of the belt is heated to a temperature of about 80° C. to cause evaporation of the water and is then cooled to yield a second layer of about $20\mu$ thickness. At a third spraying station a further layer of the copolymerization product of vinylidene chloride and acrylic acid methyl ester of the same composition as the first layer is produced and heated and cooled to a layer of $10\mu$ thickness. The resulting laminated foil has a thickness of about $40\mu$. It is separated from the carrier band. Its imperviousness to gas and water vapors is excellent and corresponds to the sum of that of the individual film layers. Heretofore, it was not possible to produce a laminated film of such properties of such a thinness. On the contrary, laminated films could be prepared only by first preparing separate foils of such a thickness of about $40\mu$ and then superposing and uniting such separate foils, thus producing a laminated structure of a much higher thickness.

*Example 2*

The procedure is the same as described in Example 1. However, in place of the film forming materials used in said Example 1, there are employed, as outer layers, films of polyvinyl acetate of a thickness of about $5\mu$ each while the inner layer consists of two layers of a copolymerization product of about 50% of acrylic acid butyl ester and about 50% of vinyl acetate, each layer having a thickness of about $10\mu$. The resulting laminated structure thus required four places of application of the plastic dispersion with four heating and four cooling zones on the endless band.

*Example 3*

The procedure is the same as described in Example 1. Whereby, however, the first outer layer of about $10\mu$ thickness consists of polyvinyl acetate, the second inner layer of about $20\mu$ thickness of polyvinyl butyral, and third outer layer of about $10\mu$ thickness of a copolymerization product of about 85% of vinylidene chloride and 15% of acrylic acid methyl ester.

*Example 4*

The procedure is the same as described in Example 1. However, other polymerization products are employed, namely polystyrene as the plastic material forming the outer layers and polyvinyl chloride containing 30% of a plasticizer which does not act as plasticizer for polystyrene and, therefore, does not diffuse from the inner layer to the surface of the outer layers of the laminated foil.

A plasticizer, as sold under the trademark "Palatinol C" by the firm BASF (Badische Anilin- und Sodafabrik) in Germany is suitable for this purpose.

*Example 5*

The procedure is the same as described in Example 1. However, the laminated foil consists of two layers only, namely of a lower layer of a plasticizer-free polyvinyl chloride of about $10\mu$ thickness and a layer of a copolymerization product of butadiene and styrene of a thickness of about $30\mu$ which is produced by applying the dispersion of said copolymerization product twice to the lower layer and producing each time a layer of about $15\mu$ thickness. The copolymerization product of butadiene and styrene used herein is the commercially available product supplied by the firm B. F. Goodrich Company of Cleveland, Ohio, under the trademark "Hycar Styrene Rubber" in the form of a dispersion.

*Example 6*

The procedure is the same as described in Example 1.

However, the inner layer of the laminated structure is a pigment-containing layer. The two outer layers consist of the copolymerization product of 85% of vinylidene chloride and 15% of acrylic acid methyl ester, while the inner layer is prepared from a dispersion containing 20% of polyisobutylene, 12% of very finely divided titanium dioxide, and 0.1% of an optical brightener, i.e., fluorescent brightening agent, as sold under the trademark "Tinopal" by the firm Geigy Chemical Corp. of New, N.Y. The thickness of the inner layer is about 20µ. The resulting laminated foil is of bright white color and substantially impervious to light.

*Example 7*

The procedure is the same as described in Example 1. However, the lower and upper outer layers consist of plasticizer-free polyvinyl chloride of about 10µ thickness while the inner layer is prepared from a polyvinyl acetate dispersion containing 20% of a polyvinyl acetate and 8% of aluminum powder. This inner layer has a thickness of about 30µ and is produced by successively spraying two layers of 15µ thickness each one upon the other. The laminated structure combines metallic appearance with high imperviousness to light.

*Example 8*

The procedure is the same as described in Example 1. However, the inner layer contains not only the plastic material but also a fungicidal agent, namely pentachloro phenol sodium. The lower and upper layer of said laminated foil consist of polyvinyl acetate of a thickness of about 5µ each, while the inner layer consists of a copolymerization product of butadiene and and acrylonitrile as it is sold by the firm B. F. Goodrich Company of Cleveland, Ohio, under the trademark "Hycar Nitrile Rubber." 10% by weight of sodium pentachloro phenolate are added to said dispersion. The inner layer is prepared so that its thickness is about 20µ. The fungicidal agent added to the laminated foil is capable of diffusing into and through the very thin outer layers and thus prevents mold formation on the foil as well as on the goods packed in such a foil.

As stated hereinabove, the manner in which the aqueous dispersions of the plastic materials are applied to the support is similar to that known to the art of applying lacquer layers. The general construction and details in apparatus for applying liquids to a carrier in order to produce a film or foil are well known to those skilled in this art, so that a detailed description thereof is not required.

Figures 3, 4:
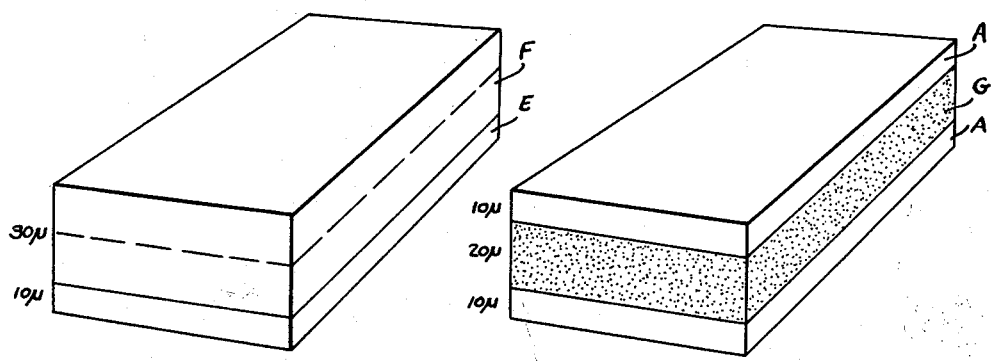
Figure 5:
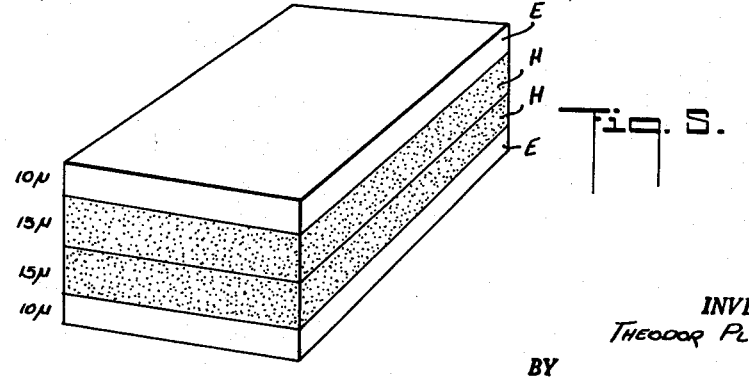

The attached drawings, however, illustrate the films or foils obtained according to the present invention. In these drawings:

FIG. 1 illustrates a three-ply laminated foil as it is obtained according to Examples 1, 3, and 4, FIG. 2 illustrates a four-ply laminated foil according to Example 2, FIG. 3 illustrates a two-ply laminated foil according to Example 5, FIG. 4 illustrates a three-ply laminated foil according to Example 6, and FIG. 5 illustrates a four-ply laminated foil according to Example 7.

Of course many changes and variations in the plastics employed in the composition of the dispersions, in the type of dispersing agent, and in the manner of producing the layers and of superimposing the same one upon the other, in the final treatment of the resulting laminated films or foils, and the like may be made by those skilled in the art in accordance with the principles set forth herein and in the claims annexed hereto.

I claim:

1. In a process of producing a substantially water- and gas-proof laminated film, the steps which consist in
    (a) applying to an impervious support of high surface smoothness a dispersion of a first synthetic thermoplastic material in a liquid wherein said material is substantially insoluble;
    (b) heating the resulting first coating to a temperature and for a time sufficient to coalesce the dispersed particles into a coherent film layer and to remove the dispersing liquid therefrom;
    (c) applying to said first film layer a dispersion of a second synthetic thermoplastic material different from said first thermoplastic material, in a liquid wherein said first and second thermoplastic materials are substantially insoluble;
    (d) one of said thermoplastic materials being capable of forming a substantially gas-proof film layer and the other one being capable of forming a substantially water-proof film layer and one of said thermoplastic materials being diffusible, on heating, into the film layer of the other one of said thermoplastic materials;
    (e) heating the resulting second coating on said first film layer to a temperature and for a time sufficient to coalesce the dispersed particles of said second thermoplastic material into a coherent second film layer to cause partial diffusion of said diffusible thermoplastic material into the other thermoplastic material, and to remove the dispersing liquid from said second film layer; and
    (f) jointly removing said superposed film layers firmly adhering to each other from said impervious support.

2. The process according to claim 1, wherein the dispersing liquid is water.

3. The process according to claim 1, wherein the thickness of each film layer does not substantially exceed a thickness of about 20µ.

4. In a process of producing a substantially water- and gas-proof laminated film, the steps which consist in
    (a) applying to an impervious support of high surface smoothness a dispersion of a first thermoplastic material selected from the group consisting of polyvinyl acetate, polystyrene, polyvinylchloride, and the copolymerization product of vinylidene chloride and an acrylic acid ester, in water;
    (b) heating the resulting first coating to a temperature and for a time sufficient to coalesce said first thermoplastic material particles into a first coherent film layer and to remove the water therefrom;
    (c) applying to said first film layer a dispersion of a second thermoplastic material selected from the group consisting of polyisobutylene, polyvinyl butyral, polyvinyl acetate, plasticizer-containing polyvinyl chloride, the copolymerization product of vinyl acetate and an acrylic acid ester, the copolymerization product of butadiene and styrene, and the copolymerization product of butadiene and acrylonitrile, said second thermoplastic material being different from said first thermoplastic material, in water;
    (d) heating the resulting second coating to a temperature and for a time sufficient to coalesce said second thermoplastic material into a second coherent film layer and to remove the water therefrom; and
    (e) removing the resulting superposed film layers firmly adhering to each other and forming a unitary laminated film structure from said impervious support.

5. In a process of producing a substantially water- and gas-proof laminated film, the steps which consist in
    (1) successively producing film layers firmly adhering to each other by
        (a) applying to an impervious support of high surface smoothness dispersions of synthetic thermoplastic materials in a dispersing liquid wherein said materials are substantially insoluble, and
        (b) heating the resulting coatings, before applying the following dispersion, to a temperature and for a time sufficient to coalesce the dispersed particles of said thermoplastic materials into coherent film layers and to remove the dispersing liquid therefrom, (c) at least two of the resulting film layers being composed of different synthetic thermoplastic materials and (d) at least one of said thermoplastic materials being diffusible, on heating, into the other ones of said thermoplastic materials, and (2) removing said superposed and firmly united laminated film layer structure from said impervious support, (3) each film layer of said unitary laminated structure having a thickness not substantially exceeding 20μ.

6. A method as set forth in claim 5, wherein at least one of said coatings is obtained by comminuting the respective dispersion into a plurality of droplets, and establishing an electrostatic potential between said droplets and the support on which said coating is to be formed, whereby said droplets are precipitated as a coating on the last-mentioned support.

References Cited in the file of this patent

UNITED STATES PATENTS

| | | |
|---|---|---|
| 2,421,787 | Helmuth | June 10, 1947 |
| 2,453,052 | Van Etten | Nov. 2, 1948 |
| 2,813,052 | Lancaster | Nov. 12, 1957 |
| 2,815,896 | Shapero et al. | Dec. 10, 1957 |
| 3,009,207 | Romesberg et al. | Nov. 21, 1961 |

FOREIGN PATENTS

| | | |
|---|---|---|
| 465,527 | Canada | May 30, 1950 |
| 148,921 | Australia | Nov. 5, 1952 |